United States Patent Office 3,536,968
Patented Oct. 27, 1970

3,536,968
CONTROL FOR THREE-PHASE SYNCHRONOUS-INTERLOCK MOTOR SYSTEM WHICH PREVENTS STARTING IF THE MOTORS ARE OUT OF ALIGNMENT
Richard Phillips Alabone, Chelmsford, and John Haydn Wood, Maldon, England, assignors to The Marconi Company Limited, London, England, a British company
Filed Apr. 1, 1968, Ser. No. 717,666
Claims priority, application Great Britain, May 11, 1967, 21,885/67
Int. Cl. H02p 7/74
U.S. Cl. 318—42                                     8 Claims

ABSTRACT OF THE DISCLOSURE

A three-phase synchronous/interlock motor system which includes at least two synchronous motors mounted on separate shafts is described. A separate interlock stator is positioned about each of the shafts. A separate three-phase interlock rotor is coupled to each shaft. The interlock rotors are electrically interconnected with one another. Devices are provided for applying A.C. voltage to the windings of the interlock stators, and devices responsive to voltage produced in the windings, due to misalignment, are provided for preventing starting whenever the rotors are misaligned. Devices which operate automatically during starting and stopping of the motors are arranged to remove power from the motors whenever the interlock is broken.

This invention relates to control arrangements for three phase synchronous/interlock motor systems.

Three-phase synchronous/interlock motor systems are in wide use for many purposes where an accurately synchronised motor drive is required, for example in cinematograph film projection to synchronise a magnetic sound record reproducer machine using perforated stock, with a film projector.

A synchronous/interlock unit consists essentially of a 3-phase synchronous drive motor, a 3-phase wound rotor and a 3-phase wound stator interlock section with a common shaft. The interlock section is usually rated for intermittent operation only. If two such units have their corresponding windings connected in parallel and a single phase supply is connected to two windings of the stators, the rotors should lock into common alignment. If now a 3-phase supply is connected to the stator circuit and either rotor is turned, the other rotor will turn in unison therewith. Either of the synchronous motors can supply the input drive. The present invention seeks to provide safety arrangement for safeguarding against certain dangerous possibilities in the behavior of 3-phase synchronous/interlock motor systems.

Figure 1:
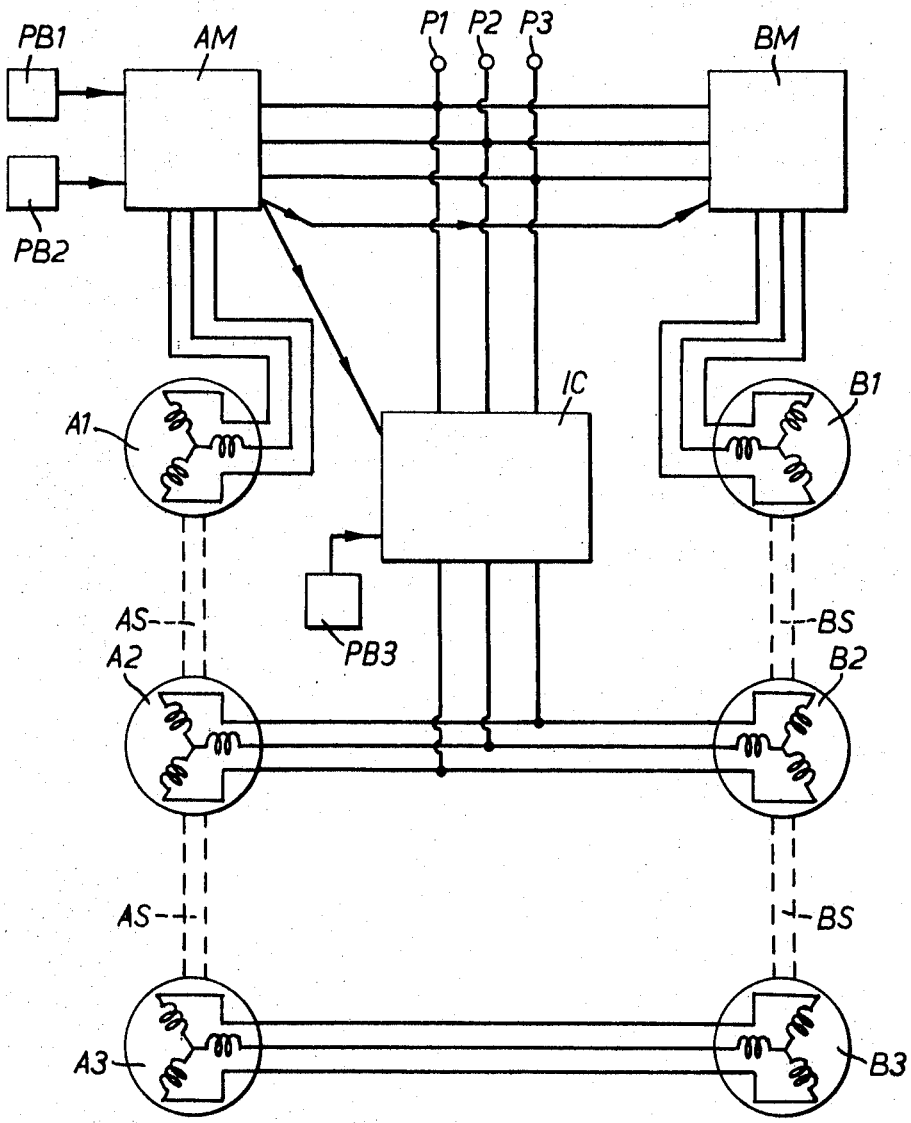
Figure 2:
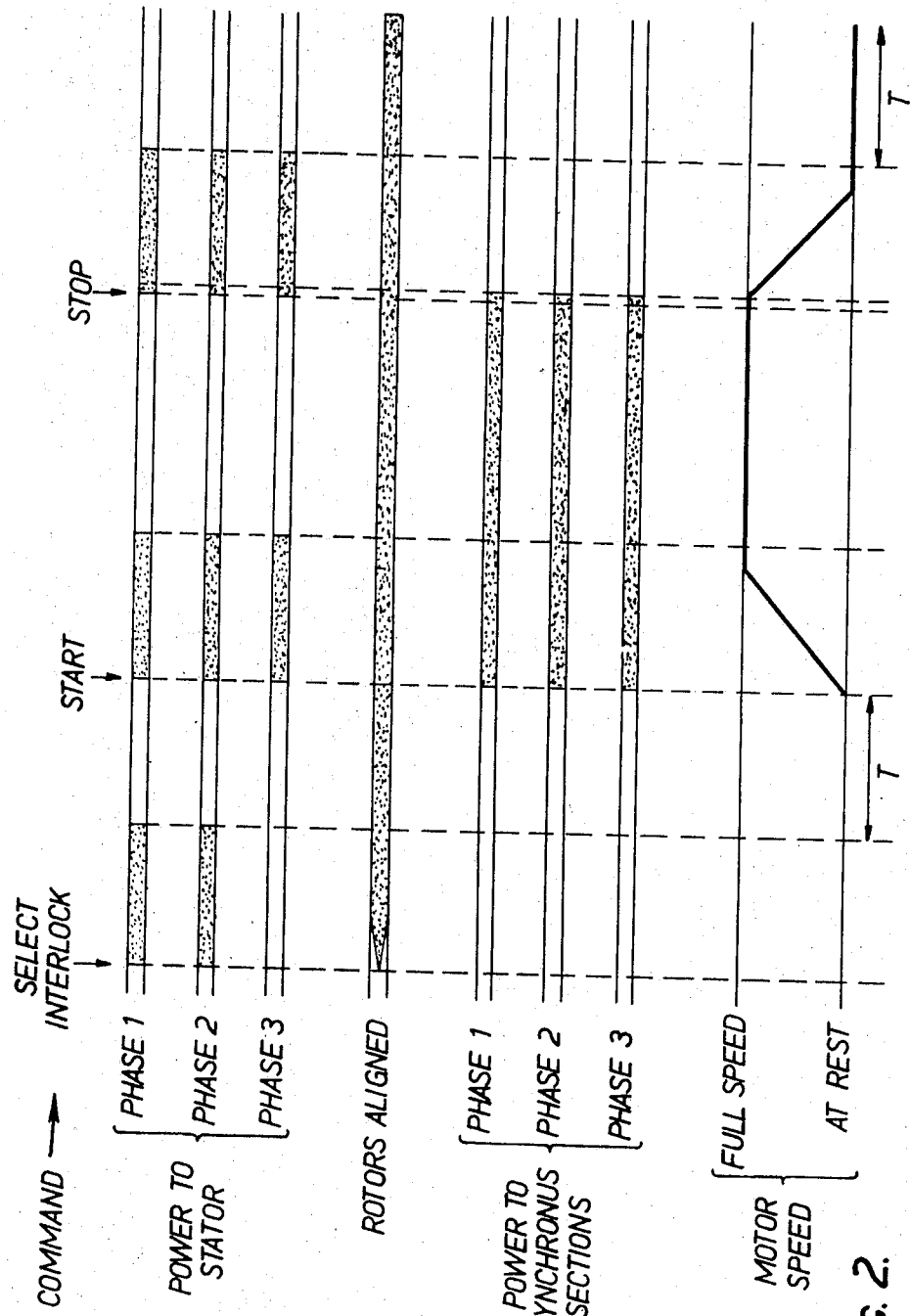
Figure 3:
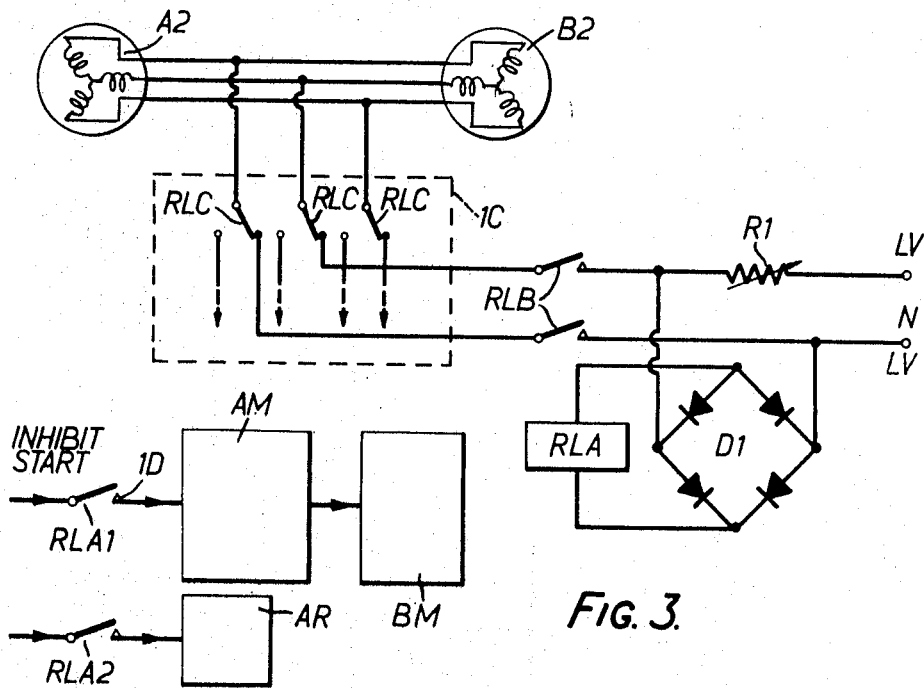
Figure 4:
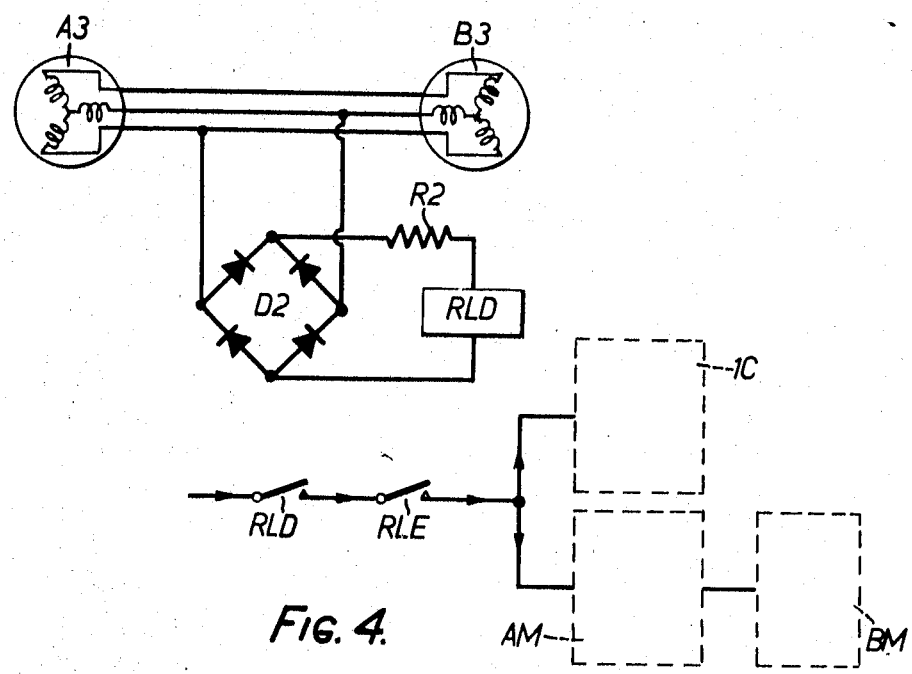
Figure 5:
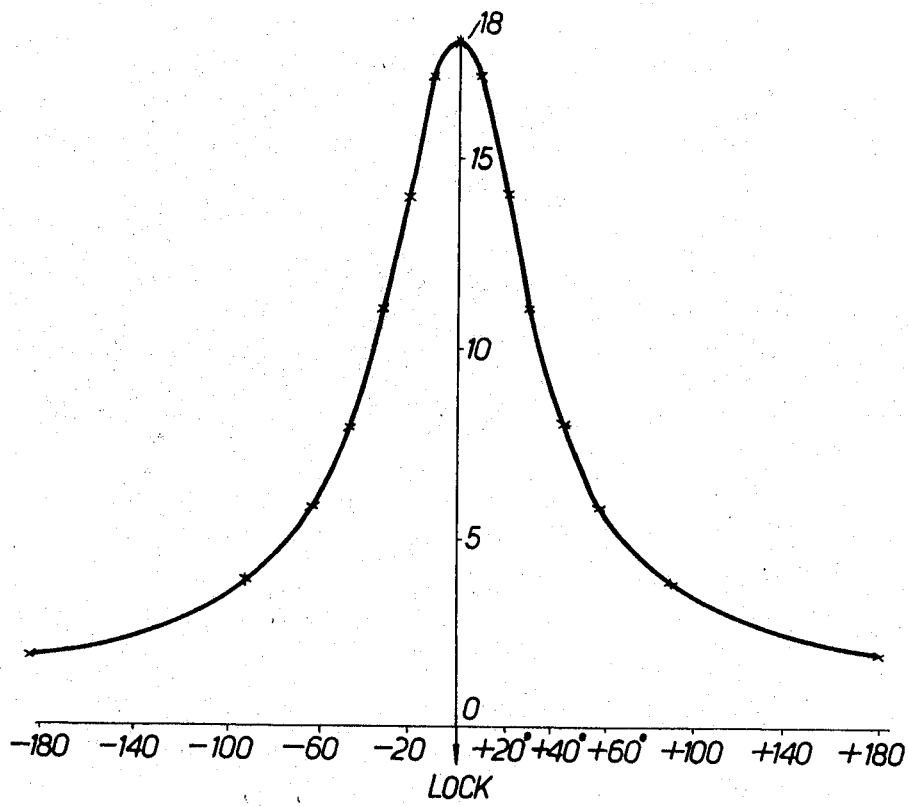

The invention is illustrated in and explained in connection with the accompanying drawings in which FIG. 1 is a simplified block diagram of a synchronous/interlock motor system comprising two interconnected synchronous/interlock units; FIG. 2 is an operational diagram showing stages in the operation of the system illustrated by FIG. 1; FIGS. 3 and 4 show safety circuits provided by this invention; and FIG. 5 is an explanatory graphical figure.

In order that the possibilities which the present invention is concerned to safeguard against will be the better understood the known system of FIG. 1 will first be described and a normal sequence of operations set out with the aid of FIG. 2.

The system of FIG. 1 comprises two synchronous/interlock units identified by the initial letters A and B. The A unit consists of a 3-phase synchronous motor A1 and a 3-phase rotor A3, both on the same shaft AS, and an interlock stator A2 mounted coaxial with the shaft AS. The corresponding parts of the B unit are referenced respectively B1, B2, B3 and BS. Three phase supply terminals are marked P1, P2 and P3. Start and stop push buttons are indicated at PB1 and PB2 respectively and interlock control circuitry which it is not necessary to describe here, as it is well known, is represented by the block 1C with its interlock selector push button PB3. As will be clear to those skilled in the art, the interlock circuitry may comprise, for example, an array of relay contacts and is designed to carry out the sequence of steps set out in the first paragraph below. A starting controller circuit, as well known per se for the motor A1 is represented by the block AM and a similar controlling circuit for the motor B1 is represented by the block BM. Three phase connections and interconnections are represented by plain lines and control information circuits by lines with arrow heads on them.

A typical operation sequence (secured with the aid of the circuitry at 1C) for starting, running and stopping the system is as shown in FIG. 2 and described below:

Step. 1.—A single phase of the power supply is connected to two windings of the 3-phase interlock stators A2 and B2 which causes the rotors A3 and B3 to lock into stationary alignment and stop.

Step 2.—After 2 or 3 seconds this power is removed.

Step. 3.—3-phase power is applied to start the motors A1 and B1 and also to the stators A2 and B2.

Step. 4.—When the motors have reached synchronous speed and are locked to the 3-phase mains supply, the 3-phase power is removed from the stators A2 and B2.

Step 5.—When it is required to stop, 3-phase power is first applied to the stators A2 and B2 and then removed from the motors A1 and B1.

Step 6.—When the system has stopped, the 3-phase power is removed from the stators A2 and B2.

Attention is called to the periods T in FIG. 2 immediately preceding starting of the motors A1 and B1 and following their stopping.

The well known system of FIG. 1 has the following dangerous possibilities:

(a) If 3-phase power is applied to the interlock stator windings when the rotors are not in accurate alignment the motors can run up to the synchronous speed of the interlock windings. This, in many cases, is twice the normal intended running speed. If this happens severe damage can be caused to film projectors or other mechanisms driven by the units.

(b) If, when single phase power is applied in Step 1 above the rotors are exactly 180° out of alignment, the motors remain in unstable equilibrium and a false lock is established. Further, during the intervals T of FIG. 2 the rotors, even if previously aligned, are not held locked, and neither can be accidently moved, e.g., manually, out of alignment. In either of these cases the motors can "run away" to an excessive speed, as in (a) above when they are started.

(c) "Running away" of the motors can also occur if, as a result of a fault, the motors break lock during starting or stopping.

The present invention seeks to provide means for safeguarding against the foregoing possibilities either by automatically giving warning of the existence of a dangerous condition or automatically remedying a dangerous condition which exists, or both.

According to this invention a three-phase synchronous/interlock motor system comprises means for applying A.C. voltage to the windings of the interconnected interlock stators and means actuated by voltage which is produced in said windings when stationary and is determined by the misalignment of the interlock rotors, for automatically preventing starting of the synchronous motor if the interlock rotors are misaligned.

Preferably, said produced voltage is also utilised to operate an alarm and/or automatically secure realignment of the rotors.

Preferably, said produced voltage is utilised to actuate a relay which is energised by a rectifier bridge connected across a relatively low voltage supply, the common terminals of said bridge and supply being connected between two phases of the interlock stators contacts which are closed during predetermined intervals preceding starting of the motors and following stopping of the motors in series with two further contacts which are provided on a relay switch device which, when the motors are running normally, supplies 3-phase power to said interlock stators.

Preferably, there is also provided means, operable automatically during periods of starting and stopping of the motors and actuated in dependence upon voltage induced in the interlock rotors, for removing power from the motors and interlock stators if, during starting or stopping of the motors, the interlock is broken. Said means for removing power preferably includes a relay connected across a rectifier bridge which is fed from two phases of the rotor interlock circuit.

The invention is illustrated in and further described in connection with FIGS. 3 to 5 in which FIGS. 3 and 4 are simplified circuit diagrams, sufficient for an understanding of the apparatus to which they refer, and FIG. 5 is an explanatory graphical figure.

Referring to FIG. 3 the stators A2 and B2 are the interlock stators A2 and B2 of FIG. 1 and block 1C represents the control circuitry block. A relay coil RLA when deenergised, closes normally closed contacts RLA1 and RLA2 in an inhibiting circuit 1D for the starting controller circuits AM and BM and in an alarm circuit for an alarm device AR. The coil RLA is energised from a low voltage (about 50 volts is practical) A.C. supply connected at terminals LV via an adjustable resistance R1 by means of a rectifier bridge D1. During the intervals T of FIG. 2 a relay coil (not shown) included in the circuitry in 1C, closes normally open contacts RLB. The closure of these contacts connects two phases of the stator circuit in parallel with the bridge circuit, these connections being made through relay contacts RLC which are actuated by a normally energised relay coil (not shown) which is also included in the circuitry at 1C and which when deenergised, leaves the contacts RLC in the positions shown. When this relay is energised—i.e., normally—the contacts RLC supply 3-phase power to the rest of the control circuitry (not shown) at 1C. Now if a small A.C. voltage is applied to the stator circuit of a synchronous interlock system while stationary, the voltage across the stator varies with misalignment of the rotors as shown by the curve of FIG. 5 in which the abscissae are values of misalignment and the ordinates are values of voltage (typical practical figures are shown) across the rectifier bridge D1 when contacts RLC are in the positions shown and contacts RLB are closed. If the rotors are aligned little current will flow in the stator windings and RLA remains energised, but if the rotors are misaligned, the current increases rapidly, the voltage across the bridge D1 falls rapidly, the relay coil RLA releases, the contacts RLA1 and RLA2 close, starting of the motors is inhibited and the alarm AR is operated. If desired a servo system (not shown) operated by the relay coil RLA or by the voltage from the rectifier bridge D1 may be provided automatically to realign the rotors until realignment of the rotors is achieved and the coil RLA is energised again to open the contacts RLA1 and RLA2. When such a servo system is provided, the contact RLA2 and the alarm RA may, of course, be omitted if desired. It will now be seen that the arrangement of FIG. 3 detects misalignment of the causes correction of misalignment during the period T before starting, inhigiting starting until misalignment is corrected.

The circuits of FIG. 1 provide means for detecting an out-of-lock condition when the motors are running and for preventing them from "running away" if such a condition exists. As already explained if, for any reason, the electrical interlock between the motors is broken while starting or stopping the motors can "run away." Referring to FIG. 4 the apparatus for safeguarding against this comprises a rectifier bridge D2 connected across two of the phases in the 3-phase connections between rotors A3, B3 of FIG. 1. The voltage from the bridge is applied through a resistance R2 to a relay coil RLD which accordingly receives a voltage dependent on the induced rotor voltage. If during starting or stopping the motors start to run away this induced voltage rapidly falls towards zero and the relay coil RLD releases, thus permitting its contacts RLD to close. These contacts are included in series with the contacts RLE of another relay (not shown) which is included in the circuitry at 1C and is so arranged that the contacts RLE are closed only during starting and stopping periods. When contacts RLD and RLE are both closed power to all sections of the units is removed so that the machines come to rest. This removal of power may be effected in any convenient way, e.g., as indicated in FIG. 4 by relay circuits (not separately shown) included in the starting controller circuits AM and BM of FIG. 1 and in the interlock control circuitry 1C of FIG. 1.

We claim:

1. A three-phase synchronous/interlock motor system comprising at least two synchronous motors each mounted on a separate shaft; at least two electrically interconnected interlock stators each positioned respectively about and coaxial with one of said shafts and each having windings; at least two three-phase interlock rotors each coupled respectively to one of said shafts, said three-phase rotors being electrically interconnected; means for applying A.C. voltage to said windings; and means responsive to voltage produced in said windings determined by misalignment of said interlock rotors for preventing start of said synchronous motors whenever said interlock rotors are misaligned.

2. A system as claimed in claim 1 including means responsive to said voltage produced in said windings for operating an alarm means.

3. A system as claimed in claim 1 including means responsive to said voltage produced in said windings for securing realignment of said rotors.

4. A system as claimed in claim 1 including means responsive to said voltage produced in said windings for actuating a relay which is energised by a rectifier bridge connected across a relatively low voltage supply, the common terminals of said bridge and supply being connected between two phases of the interlock stators by contacts which are closed during predetermined intervals preceding starting of the synchronous motors and following stopping of the synchronous motors in series with two further contacts which are provided on a relay switch device which, when the motors are running normally, supplies a 3-phase power to said interlock stators.

5. A system as claimed in claim 4 including means operable automatically during periods of starting and stopping of the synchronous motors and actuated in dependence upon voltage induced in the interlock motors, for removing power from the synchronous motors and interlock stators whenever, during starting or stopping of the synchronous motors, the interlock is broken.

6. A system as claimed in claim 5 wherein the means for removing power include a relay connected across a rectifier bridge which is fed from two phases of the rotor interlock circuit.

7. A three-phase synchronous/interlock motor system comprising at least two synchronous motors each mounted on a separate shaft; at least two electrically interconnected interlock stators each positioned respectively about and coaxial with one of said shafts and each having windings; at least two three-phase interlock rotors each coupled respectively to one of said shafts, said three-phase rotors being electrically interconnected; means for applying A.C. voltage to said windings; and means operable automatically during periods of starting and stopping of the synchronous motors and actuated in dependence upon voltage induced in the interlock rotors for removing power from the synchronous motors and interlock stators whenever, during starting or stopping of the synchronous motors, the interlock is broken.

8. A system as claimed in claim 7 wherein the means for removing power include a relay connected across a rectifier bridge which is fed from two phases of the rotor interlock circuit.

References Cited
UNITED STATES PATENTS

| | | | |
|---|---|---|---|
| 2,074,129 | 3/1937 | Nowacki | 318—41 |
| 2,246,333 | 6/1941 | Wickerham | 318—42 X |

ORIS L. RADER, Primary Examiner

A. G. COLLINS, Assistant Examiner

U.S. Cl. X.R.

318—41, 85